United States Patent
Pater et al.

(10) Patent No.: US 11,400,843 B2
(45) Date of Patent: Aug. 2, 2022

(54) SEAT CALF REST MECHANISM

(71) Applicant: LEAR CORPORATION, Southfield, MI (US)

(72) Inventors: Rafal Pater, Oberding-Schwaig (DE); Kishore Tarade, Ergolding (DE); Parashuram Rangolli, Freising (DE); Sharad Pawar, Freising (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/175,875

(22) Filed: Feb. 15, 2021

(65) Prior Publication Data

US 2021/0339668 A1   Nov. 4, 2021

(30) Foreign Application Priority Data

Apr. 30, 2020   (DE) ...................... 10 2020 205 480.0

(51) Int. Cl.
*B60N 2/90* (2018.01)
*A47C 7/50* (2006.01)
*B60N 2/02* (2006.01)

(52) U.S. Cl.
CPC ............ *B60N 2/995* (2018.02); *A47C 7/5066* (2018.08); *B60N 2/02* (2013.01)

(58) Field of Classification Search
CPC .............................. B60N 2/995; A47C 7/5066
See application file for complete search history.

(56) References Cited

U.S. PATENT DOCUMENTS

| | | | |
|---|---|---|---|
| 9,855,871 B2 | 1/2018 | Aita et al. | |
| 10,293,717 B2 | 5/2019 | Aita et al. | |
| 2010/0294886 A1 | 11/2010 | Baumann | |
| 2019/0232830 A1 | 8/2019 | Aita et al. | |
| 2019/0365107 A1 * | 12/2019 | Last .................... | A47C 7/5062 |

FOREIGN PATENT DOCUMENTS

| | | | | |
|---|---|---|---|---|
| CN | 108674275 A | * | 10/2018 | |
| CN | 109228987 B | | 10/2019 | |
| DE | 102015000841 B4 | | 9/2016 | |
| DE | 102016215741 B4 | | 9/2019 | |
| EP | 0960766 A2 | * | 12/1999 | ............ B60N 2/995 |
| EP | 1564139 A2 | * | 8/2005 | ............ B64D 11/06 |
| EP | 2209669 B1 | | 5/2013 | |
| JP | 2009066180 A | * | 4/2009 | ........... B60N 2/0232 |
| KR | 20190041631 A | | 4/2019 | |

\* cited by examiner

*Primary Examiner* — Timothy J Brindley
(74) *Attorney, Agent, or Firm* — Brooks Kushman P.C.

(57) ABSTRACT

A vehicle seat assembly with a release mechanism for a leg support member, a release mechanism, and a method of installing a release mechanism for a leg support connected to a seat assembly are provided. The release mechanism has a support member to connect to one of a seat base and a leg support member. An arm has a proximal end region rotatably connected to the support member and a distal end region, The arm defines a cam surface. A biasing member is connected to the support member, and is in contact with the distal end region of the arm. A follower is provided to connect to the other of the seat base and the leg support member, and is engageable with the cam surface of the arm when the leg support member is rotated between a deployed position and a stowed position.

20 Claims, 2 Drawing Sheets

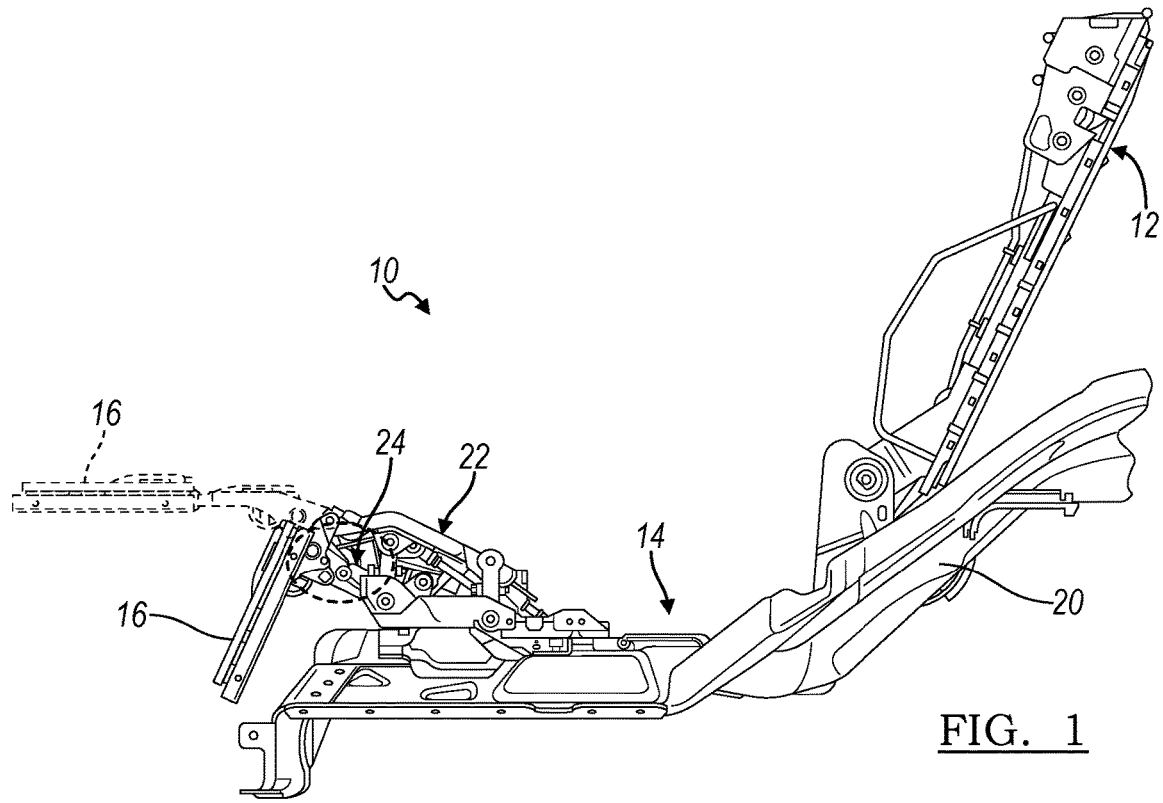
FIG. 1
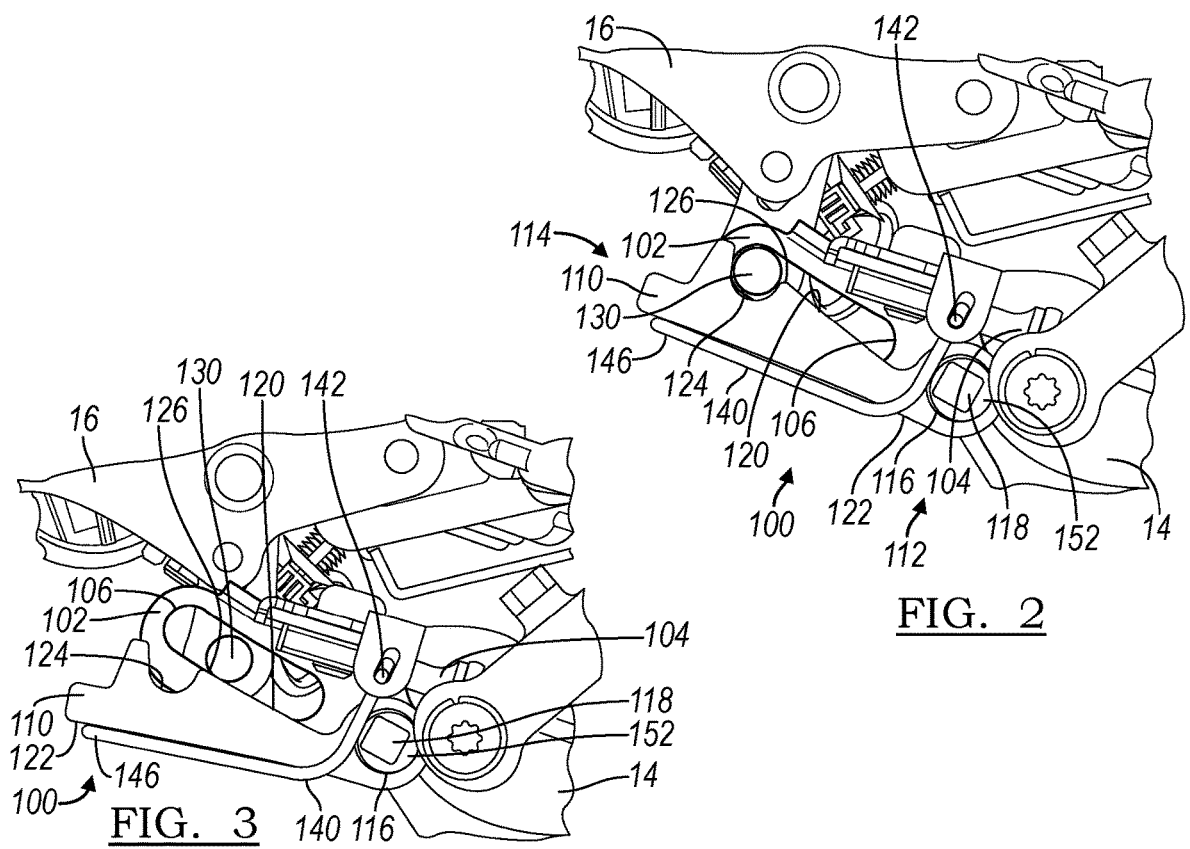
FIG. 2
FIG. 3

SEAT CALF REST MECHANISM

CROSS-REFERENCE TO RELATED APPLICATION

This application claims foreign priority benefits under 35 U.S.C. § 119(a)-(d) to DE 10 2020 205 480.0, Filed Apr. 30, 2020, the disclosure of which is hereby incorporated by reference in its entirety.

TECHNICAL FIELD

The disclosure relates to a mechanism for a vehicle seat assembly having a deployable calf rest.

BACKGROUND

A vehicle seat assembly may be provided with a deployable calf or leg rest. Examples of such vehicle seat assemblies are disclosed in German Pat. No. DE 102016215741 B4, Chinese Pat. No. CN 109228987 B, U.S. Pat. No. 10,293,717, and Korean Pat. Pub. No. KR 20190041631 A.

SUMMARY

In an embodiment, a vehicle seat assembly is provided with a seat base, and a leg support rotatably connected to the seat base and movable between a stowed position and a deployed position. An arm has a proximal end region rotatably supported by one of the seat base and the leg support, with the arm defining a cam surface. A spring is supported by the one of the seat base and the leg support, and the spring is in contact with a distal end region of the arm. A follower is connected to the other of the seat base and the leg support. The follower is engageable with the cam surface of the arm when the leg support is rotated between the deployed position and the stowed position.

In a further embodiment, from the deployed position, the follower biases the arm to rotate the leg support relative to the seat base using only a force imparted on the leg support.

In another further embodiment, the arm defines a planar surface opposite to the cam surface. The spring is engageable with the planar surface of the arm to translate therealong when the leg support is rotated between the deployed position and the stowed position.

In a further embodiment, the spring is preloaded to bias the arm in a first direction. The cam surface defines a recess and a convex transition region positioned between the distal end region and the proximal end region of the arm. In response to engagement of the follower with the transition region, the spring is further loaded, and the arm is rotated in a second direction opposite to the first direction.

In another further embodiment, a mounting bracket defines first and second guide slots spaced apart from one another, with the follower received within the first and second guide slots. The arm is positioned between the first and second guide slots and is rotatably connected to the mounting bracket.

In a yet further embodiment, the spring is a cantilever spring member having an intermediate region positioned between a first end and a second end. The first and second ends are supported by the mounting bracket, and the intermediate region is in contact with the arm.

In an even yet further embodiment, the spring is a first spring. A second cantilever spring is provided and has an intermediate region positioned between a first end and a second end, with the first and second ends of the second spring supported by the mounting bracket. The intermediate region of the second spring in contact with the arm and adjacent to the intermediate region of the first spring.

In another even yet further embodiment, a proximal end region of the arm defines an aperture. A fastener extends through the mounting bracket and the aperture of the arm to connect the arm to the mounting bracket.

In a yet even yet further embodiment, a first eccentric bushing and a second eccentric bushing are connected to the mounting bracket via the fastener. The arm is positioned between the first and second eccentric bushings. An outer surface of the first eccentric bushing contacts the spring adjacent to the first end, and an outer surface of the second eccentric bushing contacts the spring adjacent to the second end. Rotation of the first and second eccentric bushings varies a preload force of the spring on the arm.

In an even yet even yet further embodiment, the fastener has a shank defining a first non-circular cross-sectional shape. Each eccentric bushing defines an aperture therethrough with a second non-circular cross-sectional shape. The first and second non-circular cross-sectional shapes form fit with one another such that rotation of the fastener relative to the mounting bracket rotates the first and second eccentric bushings.

In a yet even yet even yet further embodiment, a third bushing and a fourth bushing are connected to the mounting bracket via the fastener. The third and fourth bushings are positioned between the first and second eccentric bushings, and the arm is positioned between the third and fourth bushings. Each of the third and fourth bushings defines an aperture therethrough with the second non-circular cross-sectional shape. Each of the third and fourth bushings defines a cylindrical outer surface sized to be received by and in contact with the aperture of the arm such that the arm rotates about the third and fourth bushings.

In another yet further embodiment, the spring is a torsion spring with an intermediate region positioned between first and second end regions. The first and second end regions are supported by the mounting bracket, and the intermediate region in contact with the arm.

In an even yet further embodiment, at least one of the first and second end regions of the torsion spring are formed as a coil.

In another even yet further embodiment, a first fastener extends through the mounting bracket and the proximal end region of the arm to rotatably connect the arm to the mounting bracket. A second fastener extends through the mounting bracket and is spaced apart from the first fastener. The second fastener supports the torsion spring adjacent to the distal end region of the arm.

In another embodiment, a release mechanism for a leg support member of a seat assembly is provided with a support member to connect to one of a seat base and a leg support member. An arm has a proximal end region rotatably connected to the support member and a distal end region, The arm defines a cam surface. A biasing member is connected to the support member, and is in contact with the distal end region of the arm. A follower is provided to connect to the other of the seat base and the leg support member, and is engageable with the cam surface of the arm when the leg support member is rotated between a deployed position and a stowed position.

In a further embodiment, the biasing member biases the arm in a first direction. The cam surface defines a recess and a convex transition region positioned between the distal end region and the proximal end region of the arm. In response to engagement of the follower with the transition region, the biasing member is further loaded and the arm is rotated in a second direction opposite to the first direction with the biasing member translating along a surface of the arm.

In a yet further embodiment, the follower sequentially engages the recess and the transition region as the leg support member is rotated from the deployed position towards the stowed position.

In an embodiment, a method of installing a release mechanism for a leg support member connected to a seat assembly is provided. A support member is connected to one of a seat base and a leg support member, and defines at least one guide slot therethrough. A proximal end region of an arm is rotatably connected to the support member, and the arm extends from the proximal end region to a distal end region. The arm defines a cam surface. A follower is connected to the other of the seat base and the leg support member such that the follower extends through the at least one guide slot. The follower is engageable with the cam surface of the arm when the leg support member is rotated between a deployed position and a stowed position. A biasing member is connected to the support member. The biasing member is preloaded such that the biasing member is in contact with the distal end region of the arm to bias the arm in a first direction towards the follower.

In a further embodiment, the arm is connected to the support member using a fastener. An eccentric bushing is supported about the fastener for rotation therewith, and is in contact with the biasing member. A preload force on the biasing member is adjusted by rotating the fastener and the eccentric bushing.

In another further embodiment, the leg support member is moved from a deployed position to a stowed position using only a force imparted on the leg support member. In response to the force imparted on the leg support member, the follower engages a convex region of the cam surface to further load the biasing member and rotate the arm in a second direction opposite to the first direction and the biasing member translates along the arm.

BRIEF DESCRIPTION OF THE DRAWINGS

FIG. 1 is a side schematic of a vehicle seat assembly with a deployable calf rest and a mechanism according to the present disclosure;

FIG. 2 is a side sectional schematic view of a release mechanism in a first, deployed, position according to an embodiment and for use with the seat assembly of FIG. 1;

FIG. 3 is a side sectional schematic view of the mechanism of FIG. 2 in a second position between a deployed position and a stowed position;

DETAILED DESCRIPTION

Figure 4:
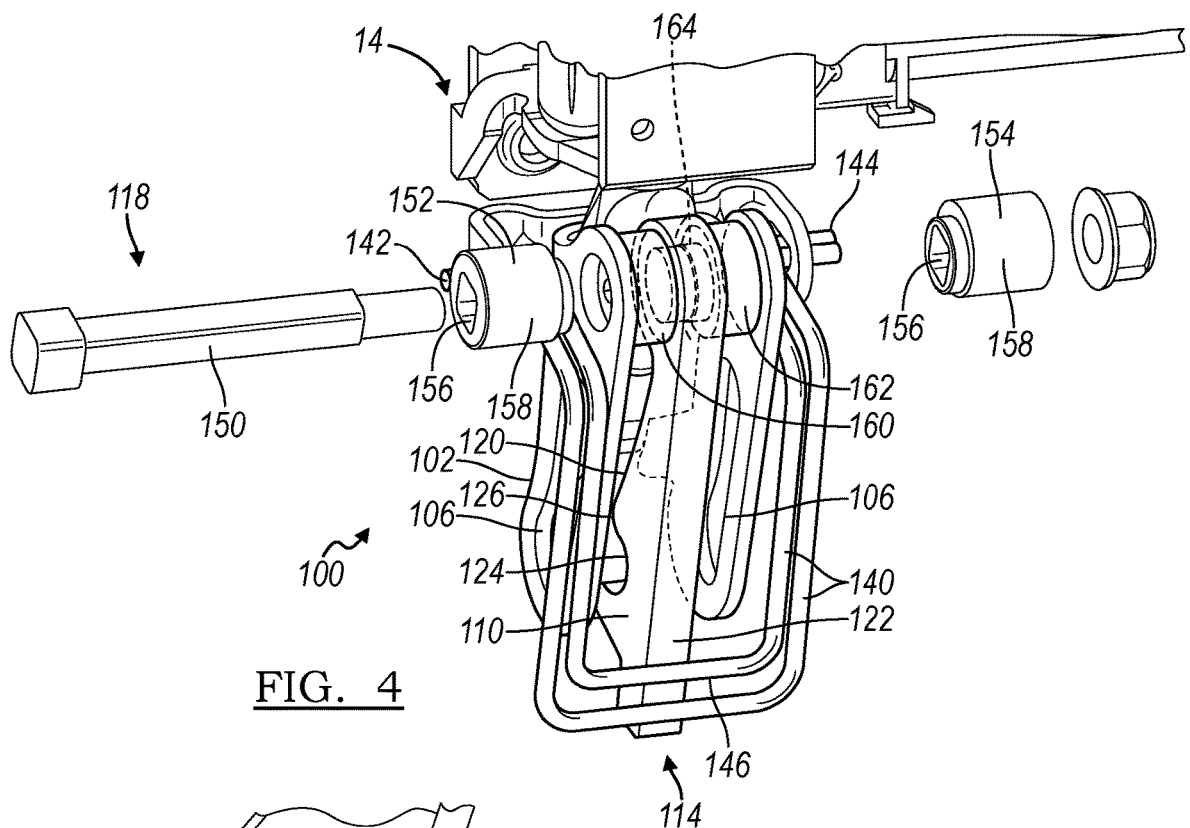
FIG. 4 is a partially exploded view of the mechanism of FIG. 2.

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

FIG. 1 illustrates a vehicle seat assembly 10 having a seat back 12, a seat base 14, and a leg support 16. The seat base may be formed from or include a portion of a vehicle frame 20, or may be a separate component that is connected to a vehicle frame. In one example, the vehicle seat assembly 10 may be provided in a second row of seats.

The leg support 16 or leg support member is rotatably connected to the seat base 14 such that the leg support 16 can fold, pivot, or rotate between a first position and a second position. In the example shown in FIG. 1, the first position is a stowed position allowing a seat occupant to place their feet on an underlying floor. The second position is a deployed position and is shown in broken lines. In the deployed position, the leg support member supports the lower leg region, e.g. calves, of a seat occupant.

The leg support member is rotatably connected to the seat base using a mechanism 22. In the non-limiting example shown, the mechanism 22 is provided by a four bar linkage, and other mechanisms are also contemplated for use with the leg support member.

The mechanism 22 is also provided with an electric motor. The electric motor may be operated or controlled by the seat occupant to selectively deploy the leg support from the stowed position to the deployed position.

The vehicle seat assembly 10 has a release mechanism 24. The release mechanism 24 is connected the seat base 14 and the leg support 16 and acts to release the leg support member 16 from the deployed position towards the stowed position solely in response to a force or load being applied to the leg support when the leg support is in the deployed position. Therefore a seat occupant can release the leg support member from the deployed position merely by using their legs to impart a force on the leg support member. The force required to release the release mechanism 24 may have an associated threshold value to prevent inadvertent release of the leg support. The release mechanism 24 acts to release the leg support without actuation of the electric motor and operates independently of the electric motor.

In the prior art, to return the leg support from the deployed position to the stowed position, the seat occupant would need to activate one or more mechanisms. For example, in various prior art, the seat occupant may need to operate the electric motor to retract the leg support, or may need to actuate a lever or other input to the mechanism 22.

FIGS. 2-4 illustrate a release mechanism 100 according to an embodiment. The release mechanism 100 may be used as release mechanism 24 with the vehicle seat assembly 10 as shown in FIG. 1. The release mechanism 100 is connected to or supported by both the leg support 16 and the seat base 14.

The release mechanism 100 has a mounting bracket 102. The mounting bracket 102 may be connected to an end region of an actuator rod 104 that is connected to the motor of the mechanism 22, and is connected to or supported by the seat base 14. The actuator rod 104 may be moved by the motor via a lead screw or the like to move the leg support from the stowed position to the deployed position. In other examples, the mounting bracket 102 may be connected to or supported by the leg support 16.

In one example, and as shown, the mounting bracket 102 has first and second guide slots 106. The guide slots 106 may be aligned with one another, and are spaced apart from one another. The guide slots 106 may be formed from opposite side regions of the mounting bracket 102, e.g. for a U-shaped mounting bracket 102.

An arm 110 is rotatably connected to the mounting bracket 102. The arm 110 has a proximal end region 112 and a distal end region 114. The proximal end region 112 is rotatably connected to the mounting bracket 102 and associated seat base. The proximal end region 112 of the arm defines an aperture 116. A fastener 118 extends through the mounting bracket 102 and the aperture 116 of the arm to connect the arm 110 to the mounting bracket 102.

As shown in FIG. 4, the arm 110 is positioned within the mounting bracket 102, and between the first and second guide slots 106.

The arm defines a cam surface 120 or first surface 120. The arm also defines a second surface 122 opposite to the cam surface 120. The cam surface 120 defines a recess 124 and a convex transition region 126 positioned between the distal end region 114 and the proximal end region 112 of the arm. In various examples, the cam surface 120 may include one or more linear, concave arcuate, convex arcuate, or another profile shapes as are known in the art. The second surface 122 may be a planar surface as shown, or may be formed with another shape.

A follower 130 or pin 130 is provided with the release mechanism 100. The follower 130 may be connected to or supported by the leg support 16 when the mounting bracket 102 is supported by the seat base 14. Alternatively, the follower 130 may be connected to or supported by the seat base when the mounting bracket is supported by the leg support.

The follower 130 or pin is received by the first and second guide slots 106, and moves within the guide slots 106 as the leg support 16 moves between the stowed and deployed positions. The follower 130 engages with or contacts the cam surface 120 of the arm 110 when the leg support 16 is rotated between the deployed position and the stowed position.

One or more springs 140 or biasing members 140 are provided. In the example shown in FIGS. 2-4, the release mechanism 100 has a pair of springs 140. In other examples, the release mechanism may have a single spring, or may have three or more springs.

Each spring 140 is supported by or connected to the mounting bracket 102 and seat base 14. The spring 140 is in contact with the second surface 122 and distal end region 114 of the arm 110.

Each spring 140 may be a cantilever spring as shown. Each spring 140 has a first end 142 and a second end 144. The first and second ends 142, 144 are supported by or connected to the mounting bracket 102. The first and second ends 142, 144 may be received by apertures in the mounting bracket 102 as shown. As can be seen in FIGS. 2-4, the springs 140 may be bent or otherwise shaped such that each spring 140 extends from the aperture in the mounting bracket towards the second surface 122, and then alongside the second surface 122 of the arm. The springs 140 may also be arranged as shown in FIG. 4, with one spring nested inside the other spring.

An intermediate region 146 of the spring is positioned between the first and second ends 142, 144 of the spring. The intermediate region 146 of each spring is in contact with the arm 110. For a release mechanism 100 with multiple springs 140, the intermediate regions 146 of the springs may be positioned adjacent to one another as shown in FIG. 4. The intermediate region 146 of the spring is in contact with the second surface 122 or planar surface of the arm 110 and translates or slides along the second surface 122 as the leg support 16 rotates between the deployed position and stowed position.

The spring 140 is preloaded upon installation of the spring 140 into the release mechanism 100 such that the arm 110 is biased in a first direction. In the example shown in FIGS. 2-3, the first direction is clockwise. Multiple springs 140 may be needed for the release mechanism in order to provide the desired preload force from the spring(s) 140 onto the arm 110.

For operation of the release mechanism such that the leg support is being released from the deployed position towards the stowed position, a force is exerted on the leg support 16 by a seat occupant. The force on the leg support causes the follower 130 to impart a force onto the cam surface 120 of the arm 110 such that the follower 130 engages the cam surface 120 and biases the arm 110 to rotate the leg support 16 relative to the seat base 14 using only the force imparted on the leg support.

In response to engagement of the follower 130 with the transition region 126 of the cam surface of the spring, the spring(s) 140 are further loaded, and the arm 110 is rotated in a second direction opposite to the first direction. As the follower 130 moves along the cam surface 120, the intermediate region 146 of the springs may translate or move along the second surface 122 of the arm. With respect to the example shown in FIGS. 2-3, the second direction is counterclockwise.

As the release mechanism releases the leg support 16 from the deployed position, the follower 130 sequentially engages the recess 124 and the transition region 126 and moves towards the proximal end of the arm 110 and within the guide slots 106, as shown in FIGS. 1-2. The leg support member 16 is released by the mechanism 100 and rotates from the deployed position towards the stowed position.

In one or more examples, it may be desirable to adjust the preload force of the springs 140 on the arm 110. By increasing the preload force provided by the springs 140 onto the arm 110, the force on the leg support 16 that is needed to release the release mechanism 100 is also increased. Similarly, by decreasing the preload force provided by the springs 140 onto the arm 110, the force on the leg support 16 that is needed to release the release mechanism 100 is also decreased.

The fastener 118 has a shank 150 defining a first non-circular cross-sectional shape. In the example shown, the non-circular shape is square; however, other non-circular shapes are also contemplated.

A first eccentric bushing 152 and a second eccentric bushing 154 are connected to the mounting bracket 102 via the fastener 118. The arm 110 is positioned between the first and second eccentric bushings 152, 154. The mounting bracket 102 is also positioned between the first and second eccentric bushings 152, 154.

Each eccentric bushing 152, 154 defining an aperture 156 therethrough with a second non-circular cross-sectional shape. The second non-circular shape may be the same as or similar to the first non-circular shape. The first and second non-circular cross-sectional shapes form fit with one another such that rotation of the fastener 118 relative to the mounting bracket 102 rotates the first and second eccentric bushings 152, 154.

An outer surface 158 of the first eccentric bushing 152 contacts the springs 140 adjacent to the first ends 142 of the spring(s), and wherein an outer surface 158 of the second eccentric bushing 154 contacts the springs 140 adjacent to the second end 144 of the spring(s). The outer surface 158 of each of the eccentric bushings 152, 154 is eccentric relative to the central or longitudinal axis of the fastener 118 and apertures of the mounting bracket 102 and arm 110.

As the fastener 118 is rotated relative to the mounting bracket 102, the form fit provided by the first and second non-circular shapes rotates the first and second eccentric bushings 152, 154 with the rotation of the fastener 118. Therefore the position of the first and second eccentric bushings 152, 154 may be adjusted relative to the mounting bracket 102, arm 110, and springs 140. The first and second non-circular shapes also maintain the position of the first and second eccentric bushings 152, 154 relative to one another such that their respective outer surfaces 158 remain aligned.

As the fastener 118 and eccentric bushings 152, 154 are rotated, the outer surface 158 of the eccentric bushings contacts the springs(s) 140, and imparts a force on the springs 140 that moves the intermediate region 146 of the spring towards or away from the distal end 114 of the arm, which in turn causes an adjustment in the location that the intermediate region 146 of the spring 140 contacts the arm 110, and varies the location of the preload force of the spring on the arm. Rotation of the first and second eccentric bushings 152, 154 therefore varies a preload force of the spring on the arm, with the preload force increasing as the intermediate region 146 of the spring moves towards the distal end 114 of the arm. FIGS. 2-3 illustrate the eccentric bushings 152, 154 interacting with the spring to provide a lower preload force on the arm, as noted by the location of the eccentricity of the bushing 152, 154 relative to the spring 140. If the eccentric bushing in FIGS. 2-3 were rotated 180 degrees, the eccentric bushings 152, 154 interacting with the spring 140 would provide a higher preload force on the arm 110.

The release mechanism 100 also has third and fourth bushings 160, 162 that are connected to the mounting bracket 102 via the fastener 118. The bushings 160, 162 allow for rotation of the arm 110 relative to the fastener 118, as the shank of the fastener has the first non-circular shape.

The third and fourth bushings 160, 162 are positioned between the first and second eccentric bushings 152, 154, and the arm 110 is positioned between the third and fourth bushings 160, 162. Each of the third and fourth bushings 160, 162 defines an aperture therethrough with the second non-circular cross-sectional shape. Each of the third and fourth bushings 160, 162 also defines a cylindrical outer surface 164 sized to be received by and in contact with the cylindrical aperture of the arm 110 such that the arm 110 rotates about the third and fourth bushings 160, 162 and the arm rotates relative to the fastener 118 and first and second bushings 152, 154.

In order to install the release mechanism 100 onto a seat assembly with a leg support member 16, such as the vehicle seat assembly 10 of FIG. 1, a support member such as a mounting bracket is connected to either the seat base or the leg support member. The proximal end region of the arm is rotatably connected to the mounting bracket using a fastener. Eccentric bushings are supported by the fastener for rotation with the fastener.

The follower is connected to the other of the seat base and the leg support member such that the follower extends through the guide slots of the mounting bracket, and such that the follower engages the cam surface of the arm when the leg support member is rotated between a deployed position and a stowed position.

One or more biasing members or springs are then connected to the mounting bracket. The springs are preloaded such that they are in contact with the distal end region of the arm to bias the arm in the first direction towards the follower. The springs are in contact with the eccentric bushings. The preload force on the biasing member is adjusted if needed by rotating the fastener and the eccentric bushing.

The leg support member is moved from a deployed position to a stowed position using only a force imparted on the leg support member. In response to the force imparted on the leg support member, the follower engages a convex region of the cam surface to further load the springs and rotate the arm in the second direction such that the springs translate or move along the arm.

Figure 5:
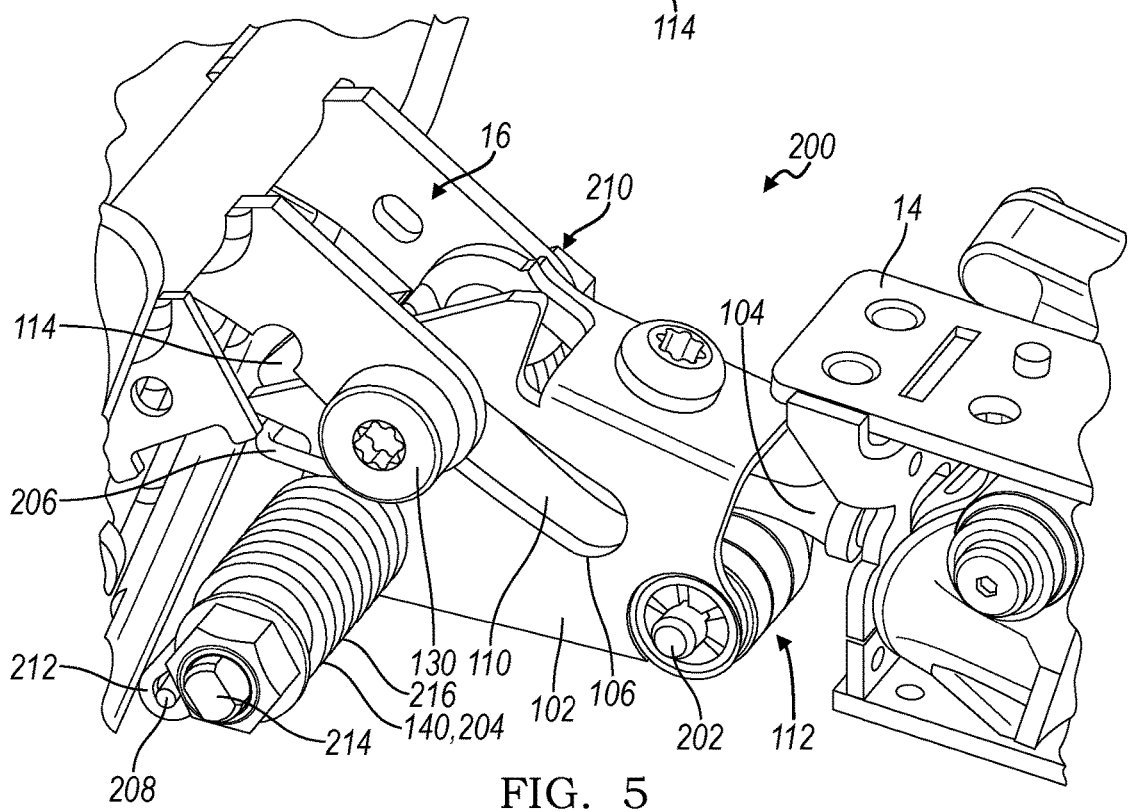
FIG. 5 is a perspective view of a release mechanism according to another embodiment, and for use with the vehicle seat assembly of FIG. 1.

FIG. 5 illustrates a release mechanism 200 according to another embodiment. The release mechanism 200 may be used as release mechanism 24 with the vehicle seat assembly 10 as shown in FIG. 1. Elements that are the same as or similar to those described with respect to FIGS. 1-4 are given the same reference numbers, and are generally described above with respect to FIGS. 1-4. The mechanism 200 operates similarly to that described above for mechanism 100.

The arm 110 has a proximal end 112 that is rotatably connected to the mounting bracket 102 and seat base 14 via a first fastener 202. The pin 130 is connected to the leg support 16. The follower 130 engages the cam surface of the arm.

The mechanism 200 has a spring 140. The spring 140 is a torsion spring 204 and has an intermediate region 206 positioned between first and second end regions 208, 210. The first and second end regions 208 and 210 are supported by respective plates 212 on a second fastener 214 on the mounting bracket 102. The second fastener 214 extends through the mounting bracket 102 adjacent to the distal end region 114 of the arm 110, and is spaced apart from the first fastener 202. The second fastener 214 supports the torsion spring 204 adjacent to the distal end region 114 of the arm.

The intermediate region 206 is in contact with the second surface of the arm 110. As shown in FIG. 5, the torsion spring 204 has first and second coiled sections 216 or coils, with each coiled section 216 positioned between the intermediate region 206 and an associated end region 208, 210.

The position of the plates 212 may be adjusted to adjust the tension in the spring 204 and vary the preload that the spring 204 applies to the arm 110.

Generally, and referring to FIGS. 1-5, the follower 130 is engageable with the cam surface 120 of the arm 110 when the leg support 16 is moved from the deployed position towards the stowed position based on a force on the leg support member 16 exceeding a threshold value. In one example, this threshold value is 400 Newtons, although other values are also contemplated, and may be based on the geometry of the seat assembly 10 and the maximum load to be applied to the motor. The follower follows the cam surface 120 as the leg support 16 rotates with respect to the seat base 14. The springs 140 are compressed in response to the follower 130 engaging the cam surface 120 such that the arm 110 is rotated in a second direction opposite to the first direction.

As the profile of the cam surface 120 changes, the follower 130 moves the arm 110 and the spring is elastically deformed. As the arm moves, the amount of force exerted by the spring 140 on the arm 110 changes as the follower 130 moves relative to the cam surface 120. For example, the follower 130 moving over the transition region 126 involves a large amount of deformation of the spring 140 over a short distance of the cam surface 120, since it is a steep profile and a convex shape.

The springs 140 maintain the arm 110 in contact with the follower 130. In response to a force applied on the leg support 16, the follower 130 exerts a force on the arm 110.

If the force applied by the follower 130 onto the arm 110 is greater than the preload force exerted by the springs 140 onto the arm 110, the follower 130 moves along the cam surface 120, the springs 140 are elastically deformed such that the arm 110 rotates in the second direction, and the intermediate region 146 of the springs may move along the second surface 122 of the arm 110. Note that the preload force applied the springs 140 may be set or tuned to correspond to the desired threshold force on the leg support to release the mechanism. Also note that the preload force may or may not be equivalent in value to the threshold force based on the geometry of the seat assembly 10 and where the forces are respectively applied to the assembly 10.

The move the leg support 16 from the deployed position to the stowed position, the user exerts a force on the leg support that will overcome the preload force applied by the springs 140, without operating a lever or other user input associated with the mechanism 22, and also without operating the motor of the mechanism 22. This simplifies operation for the seat occupant, and also provides load protection for the motor as the leg support is released based on the preload force. The eccentric bushings 152, 154 or plates 212 provide a fine tune or control over the preload force applied by the springs 140 onto the arm 110. In one example, the preload force may be varied by twenty percent or more using the eccentric bushings or plates.

Additionally, the type and location of the springs 140 according to the present disclosure provide a release mechanism with smaller packaging size, especially in the vertical direction, which allows for use with reduced clearances below the seat assembly, for lowering the seat assembly within a vehicle, and the like.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle seat assembly comprising:
    a seat base;
    a leg support rotatably connected to the seat base and being movable between a stowed position and a deployed position;
    an arm having a proximal end region rotatably supported by one of the seat base and the leg support, the arm defining a cam surface;
    a spring supported by the one of the seat base and the leg support, the spring in contact with a distal end region of the arm;
    a follower connected to the other of the seat base and the leg support, the follower engageable with the cam surface of the arm when the leg support is rotated between the deployed position and the stowed position; and
    a mounting bracket defining first and second guide slots spaced apart from one another, the follower received within the first and second guide slots;
    wherein the arm is positioned between the first and second guide slots and is rotatably connected to the mounting bracket.

2. The vehicle seat assembly of claim 1 wherein from the deployed position, the follower engages the arm and overcomes a preload force applied by the spring to rotate the leg support relative to the seat base using only a force imparted on the leg support.

3. The vehicle seat assembly of claim 1 wherein the arm defines a planar surface opposite to the cam surface; and
    wherein the spring is engageable with the planar surface of the arm to translate therealong when the leg support is rotated between the deployed position and the stowed position.

4. The vehicle seat assembly of claim 1 wherein the spring is preloaded to bias the arm in a first direction;
    wherein the cam surface defines a recess and a convex transition region positioned between the distal end region and the proximal end region of the arm; and
    wherein, in response to engagement of the follower with the transition region, the spring is further loaded, and the arm is rotated in a second direction opposite to the first direction.

5. The vehicle seat assembly of claim 1 wherein the spring is a cantilever spring member having an intermediate region positioned between a first end and a second end, the first and second ends supported by the mounting bracket, the intermediate region in contact with the arm.

6. The vehicle seat assembly of claim 5 wherein the spring is a first spring; and
    wherein the vehicle seat assembly further comprises a second cantilever spring having an intermediate region positioned between a first end and a second end, the first and second ends of the second spring supported by the mounting bracket, the intermediate region of the second spring in contact with the arm and adjacent to the intermediate region of the first spring.

7. The vehicle seat assembly of claim 5 wherein the proximal end region of the arm defines an aperture; and
    wherein the vehicle seat assembly further comprises a fastener extending through the mounting bracket and the aperture of the arm to connect the arm to the mounting bracket.

8. The vehicle seat assembly of claim 7 further comprising a first eccentric bushing and a second eccentric bushing connected to the mounting bracket via the fastener, wherein the arm is positioned between the first and second eccentric bushings;
    wherein an outer surface of the first eccentric bushing contacts the spring adjacent to the first end, and wherein an outer surface of the second eccentric bushing contacts the spring adjacent to the second end; and
    wherein rotation of the first and second eccentric bushings varies a preload force of the spring on the arm.

9. The vehicle seat assembly of claim 8 wherein the fastener has a shank defining a first non-circular cross-sectional shape; and
    wherein each eccentric bushing defining an aperture therethrough with a second non-circular cross-sectional shape, wherein the first and second non-circular cross-sectional shapes form fit with one another such that rotation of the fastener relative to the mounting bracket rotates the first and second eccentric bushings.

10. The vehicle seat assembly of claim 9 further comprising a third bushing and a fourth bushing connected to the mounting bracket via the fastener, wherein the third and fourth bushings are positioned between the first and second eccentric bushings, and the arm is positioned between the third and fourth bushings;
    wherein each of the third and fourth bushings defines an aperture therethrough with the second non-circular cross-sectional shape; and wherein each of the third and fourth bushings defines a cylindrical outer surface sized to be received by and in contact with the aperture of the arm such that the arm rotates about the third and fourth bushings.

11. The vehicle seat assembly of claim 1 wherein the spring is a torsion spring having an intermediate region positioned between first and second end regions, the first and second end regions supported by the mounting bracket, the intermediate region in contact with the arm.

12. The vehicle seat assembly of claim 11 wherein at least one of the first and second end regions of the torsion spring are formed as a coil.

13. The vehicle seat assembly of claim 11 further comprising a first fastener extending through the mounting bracket and the proximal end region of the arm to rotatably connect the arm to the mounting bracket; and
a second fastener extending through the mounting bracket and spaced apart from the first fastener, the second fastener supporting the torsion spring adjacent to the distal end region of the arm.

14. A release mechanism for a leg support member of a seat assembly, the mechanism comprising:
a support member to connect to one of a seat base and a leg support member;
an arm having a proximal end region rotatably connected to the support member and a distal end region, the arm defining a cam surface;
a biasing member connected to the support member, the biasing member in contact with the distal end region of the arm; and
a follower to connect to the other of the seat base and the leg support member, the follower engageable with the cam surface of the arm when the leg support member is rotated between a deployed position and a stowed position;
wherein the biasing member biases the arm in a first direction;
wherein the cam surface defines a recess and a convex transition region positioned between the distal end region and the proximal end region of the arm; and
wherein, in response to engagement of the follower with the transition region, the biasing member is further loaded and the arm is rotated in a second direction opposite to the first direction with the biasing member translating along a surface of the arm.

15. The mechanism of claim 14 wherein the follower sequentially engages the recess and the transition region as the leg support member is rotated from the deployed position towards the stowed position.

16. The mechanism of claim 14 further comprising a mounting bracket defining first and second guide slots spaced apart from one another, the follower received within the first and second guide slots;
wherein the arm is positioned between the first and second guide slots and is rotatably connected to the mounting bracket.

17. The mechanism of claim 14 wherein the surface of the arm is a planar surface; and
wherein the biasing member is a cantilever spring member that translates along the planar surface of the arm when the arm is rotated.

18. A method of installing a release mechanism for a leg support member connected to a seat assembly, the method comprising:
connecting a support member to one of a seat base and a leg support member, the support member defining at least one guide slot therethrough;
rotatably connecting a proximal end region of an arm to the support member, the arm extending from the proximal end region to a distal end region, the arm defining a cam surface;
connecting a follower to the other of the seat base and the leg support member such that the follower extends through the at least one guide slot, the follower engageable with the cam surface of the arm when the leg support member is rotated between a deployed position and a stowed position;
connecting a biasing member to the support member; and
preloading the biasing member such that the biasing member is in contact with the distal end region of the arm to bias the arm in a first direction towards the follower.

19. The method of claim 18 further comprising:
connecting the arm to the support member using a fastener;
supporting an eccentric bushing about the fastener for rotation therewith, the eccentric bushing in contact with the biasing member; and
adjusting a preload force on the biasing member by rotating the fastener and the eccentric bushing.

20. The method of claim 18 further comprising moving the leg support member from the deployed position to the stowed position using only a force imparted on the leg support member, wherein, in response to the force imparted on the leg support member, the follower engages a convex region of the cam surface to further load the biasing member and rotate the arm in a second direction opposite to the first direction and the biasing member translates along the arm.

* * * * *